United States Patent
Bardy et al.

(10) Patent No.: US 11,681,838 B2
(45) Date of Patent: Jun. 20, 2023

(54) DISTRIBUTED SEQUENTIAL GAUSSIAN SIMULATION

(71) Applicant: Landmark Graphics Corporation, Houston, TX (US)

(72) Inventors: Gaetan Pierre Louis Bardy, Spring, TX (US); Genbao Shi, Sugarland, TX (US); Mehran Hassanpour, Houston, TX (US)

(73) Assignee: Landmark Graphics Corporation, Houston, TX (US)

( * ) Notice: Subject to any disclaimer, the term of this patent is extended or adjusted under 35 U.S.C. 154(b) by 52 days.

(21) Appl. No.: 16/883,638

(22) Filed: May 26, 2020

(65) Prior Publication Data

US 2021/0374306 A1 Dec. 2, 2021

(51) Int. Cl.
*G06F 30/20* (2020.01)
*E21B 47/00* (2012.01)
*E21B 49/00* (2006.01)

(52) U.S. Cl.
CPC .............. *G06F 30/20* (2020.01); *E21B 47/00* (2013.01); *E21B 49/00* (2013.01); *E21B 2200/20* (2020.05)

(58) Field of Classification Search
CPC ...... G06F 30/20; G06F 2111/08; G06F 30/27; E21B 47/00; E21B 49/00; E21B 2200/20; E21B 49/005; G06N 3/02; G06N 7/01; G01V 99/005; G01V 11/00
See application file for complete search history.

(56) References Cited

U.S. PATENT DOCUMENTS

| | | |
|---|---|---|
| 8,009,170 B2 | 8/2011 | Shi et al. |
| 8,294,718 B2 | 10/2012 | Shi et al. |
| 9,157,319 B2 | 10/2015 | Varus et al. |
| 9,436,658 B2 | 9/2016 | Shi et al. |
| 9,645,280 B2 | 5/2017 | Xu et al. |
| 9,817,792 B2 | 11/2017 | Shi et al. |
| 9,897,721 B2 | 2/2018 | Fei et al. |
| 10,176,631 B2 | 1/2019 | Varus et al. |

(Continued)

FOREIGN PATENT DOCUMENTS

| | | |
|---|---|---|
| WO | 2009-075945 | 6/2009 |
| WO | 2014-164400 | 10/2014 |
| WO | 2018205986 A1 | 11/2018 |

OTHER PUBLICATIONS

Yang et al. "Stochastic seismic inversion based on an improved local gradual deformation method". Computers and Geosciences 109 (2017). pp. 75-86. (Year: 2017).*

(Continued)

*Primary Examiner* — Eunhee Kim
(74) *Attorney, Agent, or Firm* — Michael Jenney; C. Tumey Law Group PLLC

(57) ABSTRACT

A method for processing a well data log may comprise adding one or more boundary areas to the well data log, dividing the well data log into one or more segments using the one or more boundary areas, processing each of the one or more segments on one or more information handling systems, and reforming each of the one or more segments into a final simulation. A system for processing a well data log may comprise one or more information handling systems in a cluster. The one or more information handling systems may be configured to perform the method for processing the well data log.

20 Claims, 4 Drawing Sheets

(56) References Cited

U.S. PATENT DOCUMENTS

| | | | |
|---|---|---|---|
| 10,345,482 | B2 | 7/2019 | Xu et al. |
| 10,388,065 | B2 | 8/2019 | Varus et al. |
| 10,529,144 | B2 | 1/2020 | Varus et al. |
| 10,890,688 | B2* | 1/2021 | Lee ................ G01V 99/005 |
| 11,428,077 | B2* | 8/2022 | Xu ................... E21B 44/005 |
| 2008/0234988 | A1* | 9/2008 | Chen ................ G01V 11/00 703/1 |
| 2012/0136641 | A1 | 5/2012 | Fung et al. |
| 2014/0122037 | A1 | 5/2014 | Prange et al. |
| 2016/0116619 | A1* | 4/2016 | Leiceaga ............ G01V 1/345 367/72 |

OTHER PUBLICATIONS

C.H. Tai, Y. Zhao, K.M. Liew. "Parallel computation of unsteady three-dimensional incompressible viscous flow using an unstructured multigrid method". Computers & Structures. vol. 82, Issue 28. 2004. pp. 2425-2436. (Year: 2004).*

Luo et al. "Fully implicit hybrid two-level domain decomposition algorithms for two-phase flows in porous media on 3D unstructured grids". Journal of Computational Physics, vol. 409, Feb. 2020. 19 Pages. ISSN 0021-9991. (Year: 2020).*

Mariethoz, "A general parallelization strategy for random path based geostatistical simulation methods.", Computers & Geosciences, 2010, 36(7), 953-958.

Nunes et al., "Parallelization of sequential Gaussian, indicator and direct simulation algorithms.", Computers & Geosciences, 2010, 36(8), 1042-1052.

International Search Report and Written Opinion for Application No. PCT/US2020/036250, dated Feb. 22, 2021.

Emerson Gocad—Website—https://www.pdgm.com/products/gocad/.

Modeling Landmark DSG Earth—Website—https://www.landmark.solutions/DecisionSpace-Earth-Modeling.

* cited by examiner

DISTRIBUTED SEQUENTIAL GAUSSIAN SIMULATION

BACKGROUND

Boreholes drilled into subterranean formations may enable recovery of desirable fluids (e.g., hydrocarbons) using a number of different techniques. A downhole tool may be employed in subterranean operations to determine borehole and/or formation properties. During these operations, measurements from the downhole tool may be formed into well data logs. These well data logs may further be turned into simulations.

The well data logs provide the petrophysical properties such as the porosity values only at the well locations. In order to estimate the petrophysical properties at the entire volume, some stochastic simulation algorithms such as Sequential Gaussian Simulation (SGS) are applied. The traditional SGS first generates a random path covering the entire volume. At each location of the path, it uses the well data log and the previous simulated data nearby the location to estimate a conditional Gaussian distribution, and then draws a value from that distribution for that location, i.e. simulating, and repeat the process until all locations in the random path get a simulated value. Since the traditional SGS runs only on single machines, it does not scale to support large models due to the limitation of the computer's memory (RAM) and CPUs.

BRIEF DESCRIPTION OF THE DRAWINGS

These drawings illustrate certain aspects of some examples of the present disclosure and should not be used to limit or define the disclosure.

DETAILED DESCRIPTION

The present disclosure relates generally to a system and method for performing a sequential gaussian simulation. Specifically, using SGS and SIS simulation techniques with parallelizing techniques. This reduced processing time from hours to minutes, which enable better uncertainty analysis. Sequential Gaussian Simulation (SGS) is one of most popular Geostatistics algorithms to simulate petrophysical properties such as porosity and permeability. The algorithm uses the values at the previous simulated locations to simulate the value at the next location sequentially. When those locations are distributed into different machines in the distributed computing, although it is possible to retrieve the values at those locations for next location, the process is extremely slow for a simulation with millions of locations to be simulated. The traditional SGS runs in a single machine. It does not provide scalability. As disclosure below, the methods and systems modify the traditional SGS to run in cloud computing or other distributed environments with scalability, and without sacrificing the performance dramatically. The scalability of the proposed approach enables the support of large models up to billions of locations, and many simulated realizations/models which would provide better statistics about the distribution of the petrophysical properties, hence the improvement of uncertainty analysis.

Sequential gaussian simulations are performed on well data logs. Well data logs are populated from different methods and systems. Two types of well measurement systems are systems disposed on a conveyance for logging and measurements or on a bottom hole assembly during drilling operations. The bottom hole assembly may be a measurement-while drilling (MWD) or logging-while-drilling (LWD) system. In either case, measurements and data may be taken and used to populate a well data log. The well data logs may then be computed on an information handling system using sequential gaussian simulations.

Figure 1:
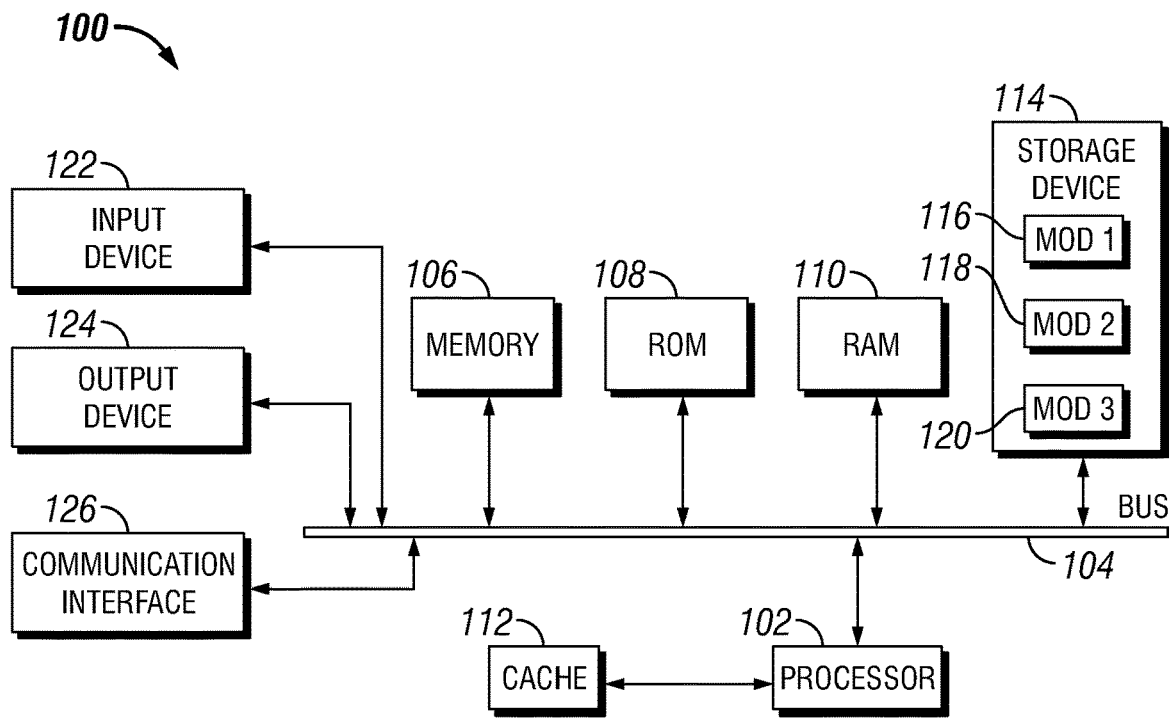
FIG. 1 is a schematic view of an information handling system.

FIG. 1 illustrates an example information handling system 100 which may be employed to perform various steps, methods, and techniques disclosed herein. Persons of ordinary skill in the art will readily appreciate that other system examples are possible. As illustrated, information handling system 100 includes a processing unit (CPU or processor) 102 and a system bus 104 that couples various system components including system memory 106 such as read only memory (ROM) 108 and random access memory (RAM) 210 to processor 102. Processors disclosed herein may all be forms of this processor 102. Information handling system 100 may include a cache 112 of high-speed memory connected directly with, in close proximity to, or integrated as part of processor 102. Information handling system 100 copies data from memory 106 and/or storage device 114 to cache 112 for quick access by processor 102. In this way, cache 112 provides a performance boost that avoids processor 102 delays while waiting for data. These and other modules may control or be configured to control processor 102 to perform various operations or actions. Other system memory 106 may be available for use as well. Memory 106 may include multiple different types of memory with different performance characteristics. It may be appreciated that the disclosure may operate on information handling system 100 with more than one processor 102 or on a group or cluster of computing devices networked together to provide greater processing capability. Processor 102 may include any general purpose processor and a hardware module or software module, such as first module 116, second module 118, and third module 120 stored in storage device 114, configured to control processor 102 as well as a special-purpose processor where software instructions are incorporated into processor 102. Processor 102 may be a self-contained computing system, containing multiple cores or processors, a bus, memory controller, cache, etc. A multi-core processor may be symmetric or asymmetric. Processor 102 may include multiple processors, such as a system having multiple, physically separate processors in different sockets, or a system having multiple processor cores on a single physical chip. Similarly, processor 102 may include multiple distributed processors located in multiple separate computing devices, but working together such as via a communications network. Multiple processors or processor cores may share resources such as memory 106 or cache 112, or may operate using independent resources. Processor 102 may include one or more state machines, an application specific integrated circuit (ASIC), or a programmable gate array (PGA) including a field PGA (FPGA).

Each individual component discussed above may be coupled to system bus 104, which may connect each and every individual component to each other. System bus 104 may be any of several types of bus structures including a memory bus or memory controller, a peripheral bus, and a local bus using any of a variety of bus architectures. A basic input/output (BIOS) stored in ROM 108 or the like, may provide the basic routine that helps to transfer information between elements within information handling system 100, such as during start-up. Information handling system 100 further includes storage devices 114 or computer-readable storage media such as a hard disk drive, a magnetic disk drive, an optical disk drive, tape drive, solid-state drive, RAM drive, removable storage devices, a redundant array of inexpensive disks (RAID), hybrid storage device, or the like. Storage device 114 may include software modules 116, 118, and 120 for controlling processor 102. Information handling system 100 may include other hardware or software modules. Storage device 114 is connected to the system bus 104 by a drive interface. The drives and the associated computer-readable storage devices provide nonvolatile storage of computer-readable instructions, data structures, program modules and other data for information handling system 100. In one aspect, a hardware module that performs a particular function includes the software component stored in a tangible computer-readable storage device in connection with the necessary hardware components, such as processor 102, system bus 104, and so forth, to carry out a particular function. In another aspect, the system may use a processor and computer-readable storage device to store instructions which, when executed by the processor, cause the processor to perform operations, a method, or other specific actions. The basic components and appropriate variations may be modified depending on the type of device, such as whether information handling system 100 is a small, handheld computing device, a desktop computer, or a computer server. When processor 102 executes instructions to perform "operations", processor 102 may perform the operations directly and/or facilitate, direct, or cooperate with another device or component to perform the operations.

As illustrated, information handling system 100 employs storage device 114, which may be a hard disk or other types of computer-readable storage devices which may store data that are accessible by a computer, such as magnetic cassettes, flash memory cards, digital versatile disks (DVDs), cartridges, random access memories (RAMs) 110, read only memory (ROM) 108, a cable containing a bit stream and the like, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with information handling system 100, an input device 122 represents any number of input mechanisms, such as a microphone for speech, a touch-sensitive screen for gesture or graphical input, keyboard, mouse, motion input, speech and so forth. Additionally, input device 122 may take in data from one or more sensors 136, discussed above. An output device 124 may also be one or more of a number of output mechanisms known to those of skill in the art. In some instances, multimodal systems enable a user to provide multiple types of input to communicate with information handling system 100. Communications interface 126 generally governs and manages the user input and system output. There is no restriction on operating on any particular hardware arrangement and therefore the basic hardware depicted may easily be substituted for improved hardware or firmware arrangements as they are developed.

As illustrated, each individual component describe above is depicted and disclosed as individual functional blocks. The functions these blocks represent may be provided through the use of either shared or dedicated hardware, including, but not limited to, hardware capable of executing software and hardware, such as a processor 102, that is purpose-built to operate as an equivalent to software executing on a general purpose processor. For example, the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 108 for storing software performing the operations described below, and random access memory (RAM) 110 for storing results. Very large scale integration (VLSI) hardware embodiments, as well as custom VLSI circuitry in combination with a general purpose DSP circuit, may also be provided.

The logical operations of the various methods, described below, are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. Information handling system 100 may practice all or part of the recited methods, may be a part of the recited systems, and/or may operate according to instructions in the recited tangible computer-readable storage devices. Such logical operations may be implemented as modules configured to control processor 102 to perform particular functions according to the programming of software modules 116, 118, and 120.

In examples, one or more parts of the example information handling system 100, up to and including the entire information handling system 100, may be virtualized. For example, a virtual processor may be a software object that executes according to a particular instruction set, even when a physical processor of the same type as the virtual processor is unavailable. A virtualization layer or a virtual "host" may enable virtualized components of one or more different computing devices or device types by translating virtualized operations to actual operations. Ultimately however, virtualized hardware of every type is implemented or executed by some underlying physical hardware. Thus, a virtualization compute layer may operate on top of a physical compute layer. The virtualization compute layer may include one or more virtual machines, an overlay network, a hypervisor, virtual switching, and any other virtualization application.

Figure 2:
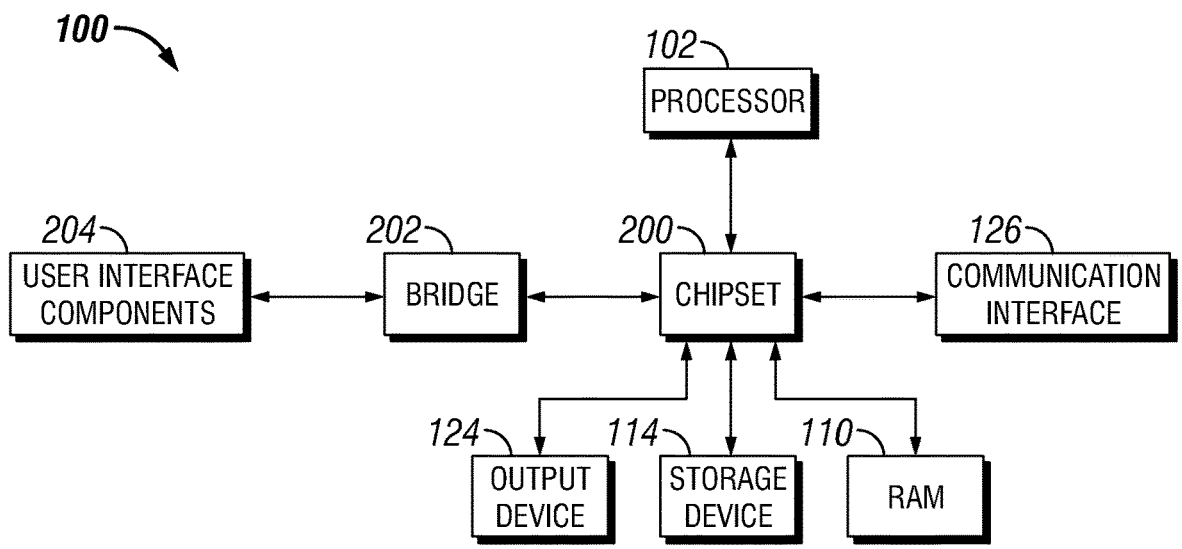
FIG. 2 is another schematic view of the information handling system.

FIG. 2 illustrates an example information handling system 100 having a chipset architecture that may be used in executing the described method and generating and displaying a graphical user interface (GUI). Information handling system 100 is an example of computer hardware, software, and firmware that may be used to implement the disclosed technology. Information handling system 100 may include a processor 102, representative of any number of physically and/or logically distinct resources capable of executing software, firmware, and hardware configured to perform identified computations. Processor 102 may communicate with a chipset 100 that may control input to and output from processor 102. In this example, chipset 200 outputs information to output device 124, such as a display, and may read and write information to storage device 114, which may include, for example, magnetic media, and solid state media. Chipset 200 may also read data from and write data to RAM 110. A bridge 202 for interfacing with a variety of user interface components 204 may be provided for interfacing with chipset 200. Such user interface components 204 may include a keyboard, a microphone, touch detection and processing circuitry, a pointing device, such as a mouse, and so on. In general, inputs to information handling system 100 may come from any of a variety of sources, machine generated and/or human generated.

Chipset 200 may also interface with one or more communication interfaces 126 that may have different physical interfaces. Such communication interfaces may include interfaces for wired and wireless local area networks, for broadband wireless networks, as well as personal area networks. Some applications of the methods for generating, displaying, and using the GUI disclosed herein may include receiving ordered datasets over the physical interface or be generated by the machine itself by processor 102 analyzing data stored in storage device 114 or RAM 110. Further, information handling system 100 receive inputs from a user via user interface components 404 and execute appropriate functions, such as browsing functions by interpreting these inputs using processor 102.

In examples, information handling system 100 may also include tangible and/or non-transitory computer-readable storage devices for carrying or having computer-executable instructions or data structures stored thereon. Such tangible computer-readable storage devices may be any available device that may be accessed by a general purpose or special purpose computer, including the functional design of any special purpose processor as described above. By way of example, and not limitation, such tangible computer-readable devices may include RAM, ROM, EEPROM, CD-ROM or other optical disk storage, magnetic disk storage or other magnetic storage devices, or any other device which may be used to carry or store desired program code in the form of computer-executable instructions, data structures, or processor chip design. When information or instructions are provided via a network, or another communications connection (either hardwired, wireless, or combination thereof), to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

In additional examples, methods may be practiced in network computing environments with many types of computer system configurations, including personal computers, hand-held devices, multi-processor systems, microprocessor-based or programmable consumer electronics, network PCs, minicomputers, mainframe computers, and the like.

Examples may also be practiced in distributed computing environments where tasks are performed by local and remote processing devices that are linked (either by hard-wired links, wireless links, or by a combination thereof) through a communications network. In a distributed computing environment, program modules may be located in both local and remote memory storage devices.

Information handling system 100 (e.g., referring to FIGS. 1 and 2) may further take measurements taken by downhole tool 102 during logging operations through a plurality of sensors 128 (e.g., referring to FIGS. 1 and 2) to produce a well log. In examples, the well log may be based on depth and properties of formation 132 (e.g., referring to FIGS. 1 and 2). The well log may include a continuous measurement of formation properties with depth resolutions, which may also be identified as a well data log. In a well log, well data log may exhibit variation along designated measured sections, i.e., a chosen depth or set of depths to be investigated, due to heterogeneous nature of rocks within formation 132. Variations are attributed to formation 132 being comprised of different types of rock and that rock being saturated with varying amounts of water, oil, and gas depending on the depth of the formation being examined. The depth dependence of fluid content is a function of fluid density. Additionally, formations 132 may include faults and other petrophysical baffles that vary azimuthally. The well data log may be used to create a simulation. The well data logs provide the petrophysical properties such as the porosity values only at the well locations. In order to estimate the petrophysical properties at the entire volume, some stochastic simulation algorithms such as Sequential Gaussian Simulation (SGS) are applied. The traditional SGS first generates a random path covering the entire volume. At each location of the path, it uses the well data log and the previous simulated data nearby the location to estimate a conditional Gaussian distribution, and then draws a value from that distribution for that location, i.e. simulating, and repeat the process until all locations in the random path get a simulated value. Since the traditional SGS runs only on single machines, it does not scale to support large models due to the limitation of the computer's memory (RAM) and CPUs. The proposed method described below, may allow the SGS running on many computers simultaneously. By dividing the simulation into many computers innovatively—that is, dividing the entire volume into many smaller volumes, distributes those smaller volumes into many computers in the cloud, and run the SGS on those computers. In such as a way, an original large model with billions of locations now becomes a collection of many smaller models with possibly only millions of locations on different computers. And the simulation can be run on those computers simultaneously. Hence, it becomes possible to support large models up to billions of locations without sacrificing the performance and accuracy.]

Figure 3A:
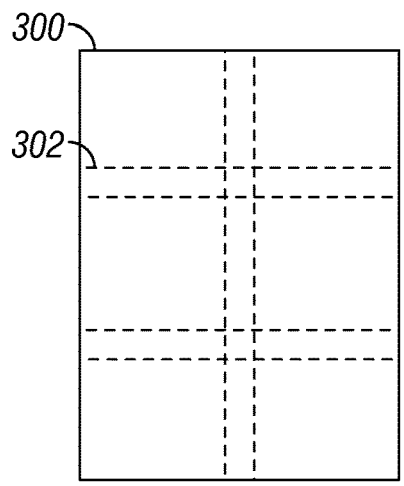
FIGS. 3A-3E illustrate a method for banding during sequential gaussian simulations.

FIG. 3A illustrates simulation 300 that may be processed by information handling system 100 (e.g., referring to FIG. 1) under a sequential gaussian simulation. During this processing, sequential gaussian simulations are difficult to parallelize due to the simulation's sequential nature. Parallelize is defined as a computation that may be performed by one or more information handling systems 100 (e.g., referring to FIG. 1), simultaneously. However, since SGS requires the previous simulated values in order to estimate the following simulated values, it requires the simulation to be performed one after another. This may make it difficult with a single information handling system 100 to compute parallelizing.

The method described below overcomes the problem by generating one or more overlapping bands and then distributing each segment created by the overlapping band to different processing nodes. Each node may be an independent information handling system 100 connected to each other by a network either onsite or offsite. Currently, SGS and Sequential Indicator Simulation (SIS) are the oldest simulation techniques being used to process information. The ability to parallelize SGS and SIS is a major improvement to current technology. Additionally, the methods is flexible to be scaled, depending on cluster size. A cluster is a collection of managed information handling system 100. The cluster size means how many information handling systems 100 in the collection and how many total CPUs from those information handling systems 100. Adding the ability to parallelize SGS and SIS may reduce processing time of well log date from hours to minutes.

Figure 3B:
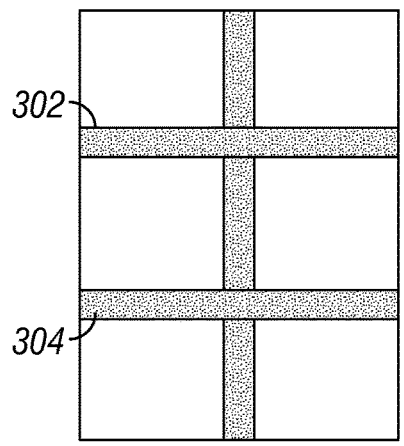
Figure 3C:
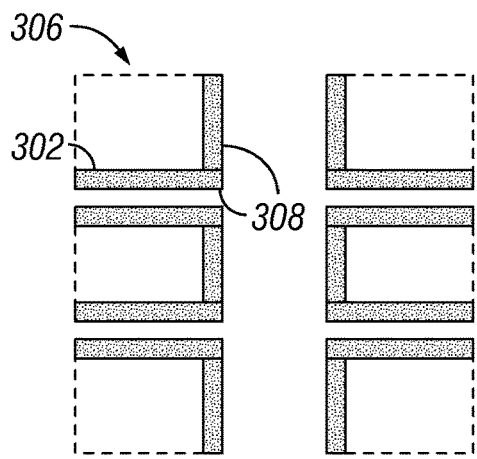

With continued reference to FIG. 3A, simulation 300 may be banded by defining one or more boundary areas 302. The size of the boundary area 302 may be based at least in part on the variogram parameter, to make it at least the size of the range in each direction. A variogram parameter is a geostatistics tool to measure the dis-continuity of a spatial property such as porosity. It may be described by one or more parameters such as the type, the continuity of ranges, and the contributions. A range of a variogram is a distance in which two chosen locations within that distance may have any correlation. FIG. 3B illustrates data 304 from simulation 300 within boundary area 302. In FIG. 3C, the boundary areas 302 are divided to form as many segments 306 for available processing resources. For example, if six information handling systems 100 are available for processing in a cluster, cloud, network, or the like, then six segments 306 may be formed. Additionally, the size of each segment 306 should be a size that allows for quick processing. As each information handling system 100 has limited memory RAM. If the size of each segment 306 is too large, it may not fit into the RAM. Thus, the size of each segment 306 is limited by the size of RAM.

With continued reference to FIG. 3C, each segment may be sent for processing with a least at least two parts 308 of boundary area 302. This may allow each segment 306 to be computed to condition the simulation properly. As discussed above, each segment 306 may be sent to an individual information handling system 100 in a neural network.

Figure 4:
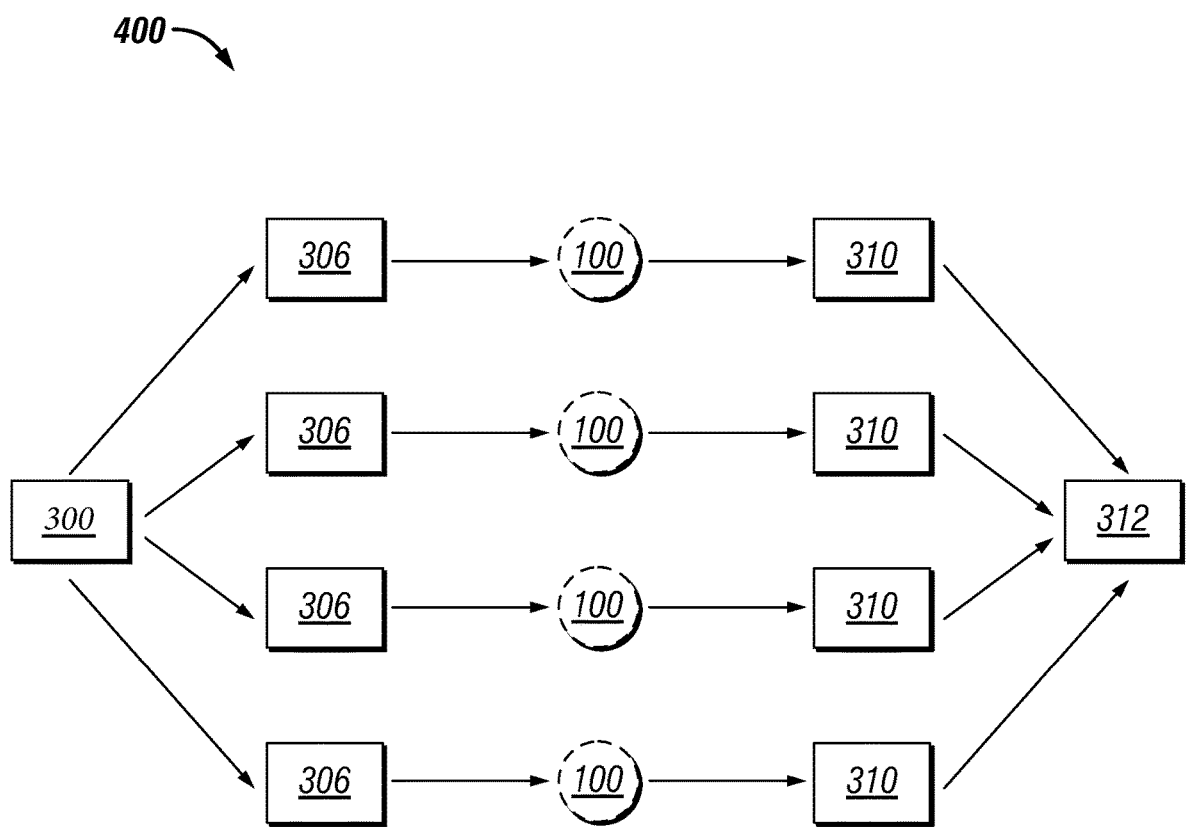
FIG. 4 is an example of a neural network.

FIG. 4 illustrates a neural network 400 that may include one or more information handling systems 100. As illustrated, simulation 300 is divided into one or more segments 306, which are processed by individual information handling systems 100. After processing each segment 306, a processed segment 310 is produced from each information handling system 100.

Figure 3D:
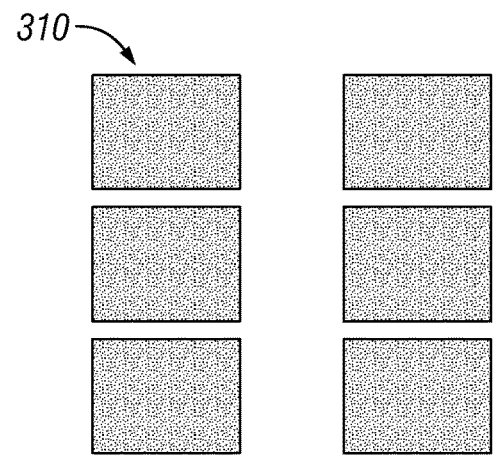
Figure 3E:
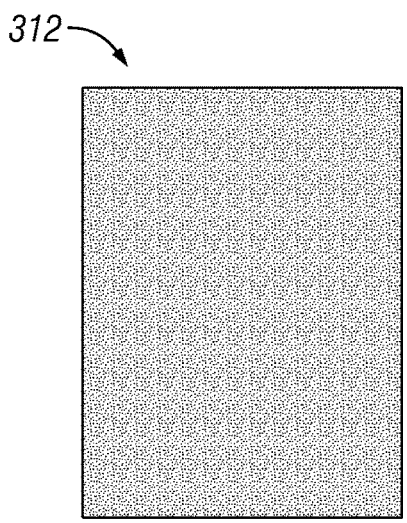

Referring to FIG. 3D, FIG. 3D illustrates each processed segment 310 may include simulated values. In FIG. 3E, processed segments 310 are reformed into final simulation 312. Final simulation 312 provides simulated values collected from each of the one or more information handling systems 100 (e.g., referring to FIG. 1) in the cluster, network, and/or the like. Processed segments 310 with the simulated values plus the original well data log are sent to the computers in the cluster. Then two kinds of data (simulated values on the segment and the well data) are used as the control data by SGS to perform the simulation on each information handling systems 100 in the cluster. After simulation on information handling systems 100 is done, the simulated values are combined together to form the final simulation, which is called a model. If more than one realization is performed, the process will generate multiple models. Those models are then used for volumetric computation and uncertainty analysis. For example. Those models are used to estimated how much oil in the volume, and what the expected amount of oil and what is the standard errors of the estimation.

Figure 5:
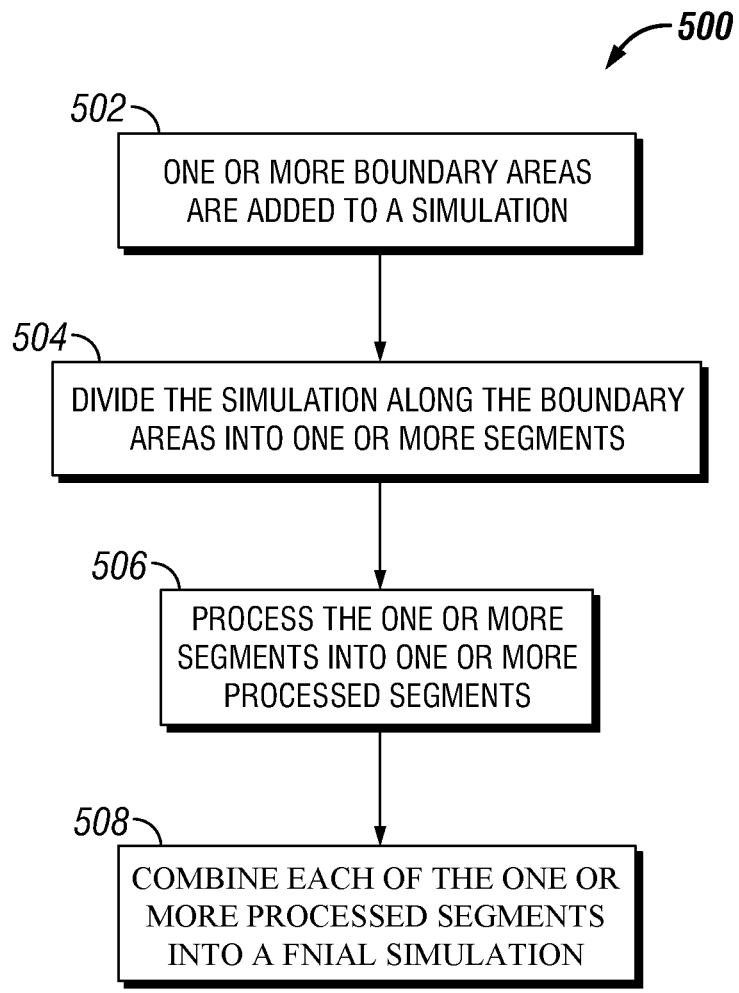
FIG. 5 is a workflow for performing a sequential gaussian simulation and parallelizing the simulation.

FIG. 5 is a workflow 500 for performing a sequential gaussian simulation and parallelizing the simulation. Workflow 500 may begin with block 502 in which one or more boundary areas are added to a simulation. The size of the boundary area may be based at least in part on the variogram parameter, to make it at least the size of the range in each direction. In block 504 the simulation is divided along the boundary areas into one or more segments to available processing resources. For example, if six information handling systems 100 (e.g., referring to FIG. 1) are available for processing, then six segments may be formed. In block 506 the one or more segments may be sent for processing. In block 508 each segment, after processing in block 506, are reformed into final simulation.

Current technology utilizes SGS to generate a random path covering the entire volume. At each location of the path, it uses the well data log and the previous simulated data nearby the location to estimate a conditional Gaussian distribution, and then draws a value from that distribution for that location, i.e. simulating, and repeat the process until all locations in the random path get a simulated value. Since the traditional SGS runs only on single machines, it does not scale to support large models due to the limitation of the computer's memory (RAM) and CPUs. The methods and systems described above allows the SGS running on many computers simultaneously. By dividing the simulation into many computers innovatively—that is, dividing the entire volume into many smaller volumes, distributes those smaller volumes into many computers in the cloud, and run the SGS on those computers. In such as a way, an original large model with billions of locations now becomes a collection of many smaller models with possibly only millions of locations on different computers. And the simulation may be run on those computers simultaneously. Hence, it becomes possible to support large models up to billions of locations without sacrificing the performance and accuracy. The systems and methods may include any of the various features of the systems and methods disclosed herein, including one or more of the following statements.

Statement 1. A method for processing a well data log may comprise adding one or more boundary areas to the well data log, dividing the well data log into one or more segments using the one or more boundary areas, processing each of the one or more segments on one or more information handling systems, and reforming each of the one or more segments into a final simulation.

Statement 2. The method of statement 1, wherein the one or more boundary areas are defined by a variogram parameter.

Statement 3. The method of statement 2, wherein the variogram parameter is bound by a distance in which two chosen locations within the distance have correlation.

Statement 4. The method of statement 3, wherein the one or more boundary areas includes data from the well data log.

Statement 5. The method of statements 1 or 2, wherein the one or more boundary areas are based at least in part on a cluster size.

Statement 6. The method of statements 1, 2, or 5, wherein each of the one or more segments are processed using Sequential Gaussian Simulation (SGS) or Sequential Indicator Simulation (SIS).

Statement 7. The method of statements 1, 2, 5, or 6, wherein the one or more segments are formed based at least in part on a number of information handling systems in a cluster available for processing.

Statement 8. The method of statement 7, wherein each of the information handling systems are a node in the cluster.

Statement 9. The method of statement 8, wherein each of the one or more segments reduce computational time of the well data log.

Statement 10. The method of statements 1, 2, or 5-7, wherein the final simulation forms at least one model that is configured to estimate how much oil is in a volume and a standard error for the at least one model.

Statement 11. A system for processing a well data log may comprise one or more information handling systems in a cluster. The one or more information handling systems may be configured to add one or more boundary areas to the well data log, divide the well data log into one or more segments using the one or more boundary areas, process each of the one or more segments on the one or more information handling systems, and reform each of the one or more segments into a final simulation.

Statement 12. The system of statement 11, wherein the one or more boundary areas are defined by a variogram parameter.

Statement 13. The system of statement 12, wherein the variogram parameter is bound by a distance in which two chosen locations within the distance have correlation.

Statement 14. The system of statement 13, wherein the one or more boundary area includes data from the well data log.

Statement 15. The system of statements 11 or 12, wherein the one or more boundary area is based at least in part on a cluster size.

Statement 16. The system of statements 11, 12, or 15, wherein each of the one or more segments are processed using Sequential Gaussian Simulation (SGS) or Sequential Indicator Simulation (SIS).

Statement 17. The system of statements 11, 12, 15, or 16, wherein the one or more segments are formed based at least in part on a number of information handling systems in the cluster available for processing.

Statement 18. The system of statement 17, wherein each of the information handling systems are a node in the cluster.

Statement 19. The system of statement 18, wherein each of the one or more segments reduce computational time of the well data log.

Statement 20. The system of statements 11, 12, or 15-17, wherein the final simulation forms at least one model that is configured to estimate how much oil is in a volume and a standard error for the at least one model.

Although the present disclosure and its advantages have been described in detail, it should be understood that various changes, substitutions, and alterations may be made herein without departing from the spirit and scope of the disclosure as defined by the appended claims. The preceding description provides various examples of the systems and methods of use disclosed herein which may contain different method steps and alternative combinations of components. It should be understood that, although individual examples may be discussed herein, the present disclosure covers all combinations of the disclosed examples, including, in examples, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the elements that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method for processing a well data log comprising:
   measuring a formation with one or more sensors in a drilling or a logging operation to produce data;
   populating the data onto the well data log;
   parallelizing processing of each of two or more segments of the well data log comprising:
      building one or more boundary areas into the well data log to form an overlapping band;
      simulating at least part of the data within the overlapping band with a simulation algorithm to form simulated band data;
      dividing the well data log into the two or more segments of the well data log and the overlapping band with the one or more boundary areas, wherein at least two segments from the two or more segments of the well data log comprise the same simulated band data from at least part of the overlapping band; and
      simulating data from each of the two or more segments of the well data log with a neural network, wherein the neural network uses the simulated band data on one or more information handling systems; and
   reforming each of the two or more segments of the well data log into a final simulation.

2. The method of claim 1, wherein the one or more boundary areas are defined by a variogram parameter.

3. The method of claim 2, wherein the variogram parameter is bound by a distance in which two chosen locations within the distance have correlation.

4. The method of claim 3, wherein the one or more boundary areas includes data from the well data log.

5. The method of claim 1, wherein the one or more boundary areas are based at least on a cluster size.

6. The method of claim 1, wherein the simulation algorithm is a Sequential Gaussian Simulation (SGS) or a Sequential Indicator Simulation (SIS).

7. The method of claim 1, wherein the two or more segments of the well data log are formed based at least on a number of information handling systems in a cluster available for processing.

8. The method of claim 7, wherein each of the information handling systems are a node in the cluster.

9. The method of claim 8, wherein each of the two or more segments of the well data log reduce computational time of the well data log.

10. The method of claim 1, wherein the final simulation forms at least one model that is configured to estimate how much oil is in a volume and a standard error for the at least one model.

11. A system for processing a well data log comprising:
one or more sensors to measure a formation in a drilling or a logging operation to produce data;
one or more information handling systems in a cluster configured to:
  populate the data onto the well data log;
  parallelize process of each of two or more segments of the well data log comprising:
    build one or more boundary areas into the well data log to form an overlapping band;
    simulate at least part of the data within the overlapping band with a simulation algorithm to form simulated band data;
    divide the well data log into two or more segments of the well data log and the overlapping band with the one or more boundary areas, wherein at least two segments from the two or more segments of the well data log comprise the same simulated band data from at least part of the overlapping band; and
  simulate data from each of the two or more segments of the well data log with a neural network, wherein the neural network uses the simulated band data on the one or more information handling systems; and
  reform each of the two or more segments of the well data log into a final simulation.

12. The system of claim 11, wherein the one or more boundary areas are defined by a variogram parameter.

13. The system of claim 12, wherein the variogram parameter is bound by a distance in which two chosen locations within the distance have correlation.

14. The system of claim 13, wherein the one or more boundary area includes data from the well data log.

15. The system of claim 11, wherein the one or more boundary area is based at least on a cluster size.

16. The system of claim 11, wherein the simulation algorithm is a Sequential Gaussian Simulation (SGS) or Sequential Indicator Simulation (SIS).

17. The system of claim 11, wherein the two or more segments of the well data log are formed based at least on a number of information handling systems in the cluster available for processing.

18. The system of claim 17, wherein each of the information handling systems are a node in the cluster.

19. The system of claim 18, wherein each of the two or more segments of the well data log reduce computational time of the well data log.

20. The system of claim 11, wherein the final simulation forms at least one model that is configured to estimate how much oil is in a volume and a standard error for the at least one model.

* * * * *